L. S. ROBBINS & J. R. DAVIS.
RESILIENT WHEEL.
APPLICATION FILED APR. 15, 1911.
1,047,297.
Patented Dec. 17, 1912.
2 SHEETS—SHEET 2.
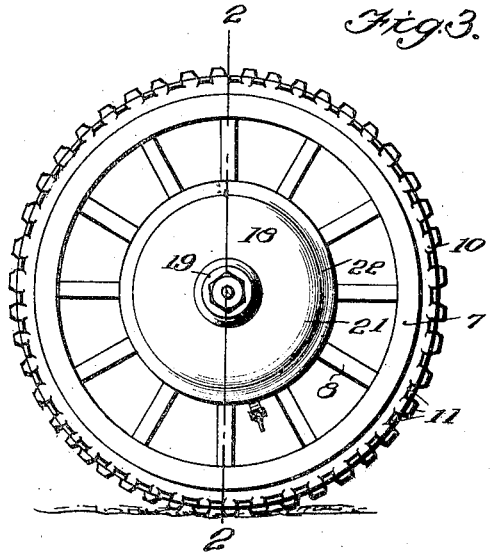
Fig. 3.
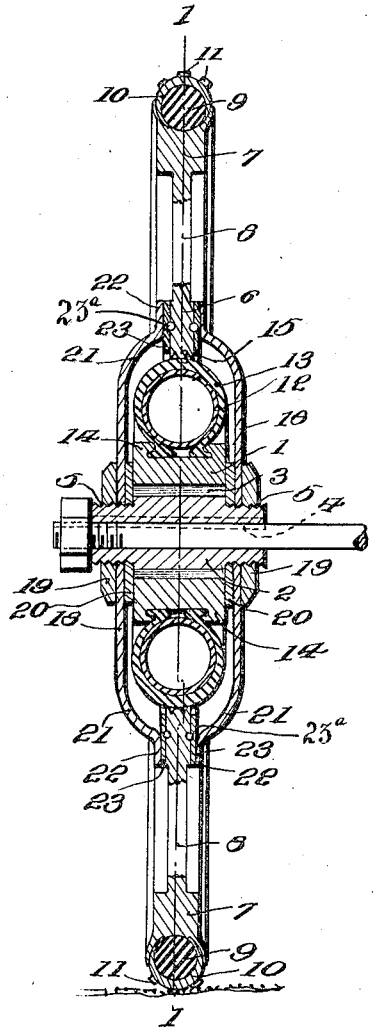
Fig. 2.
Fig. 4.
Witnesses
W. N. Woodson
Cora N. Handy
Inventors
L. S. Robbins
J. R. Davis
By Abrhacy, Attorneys

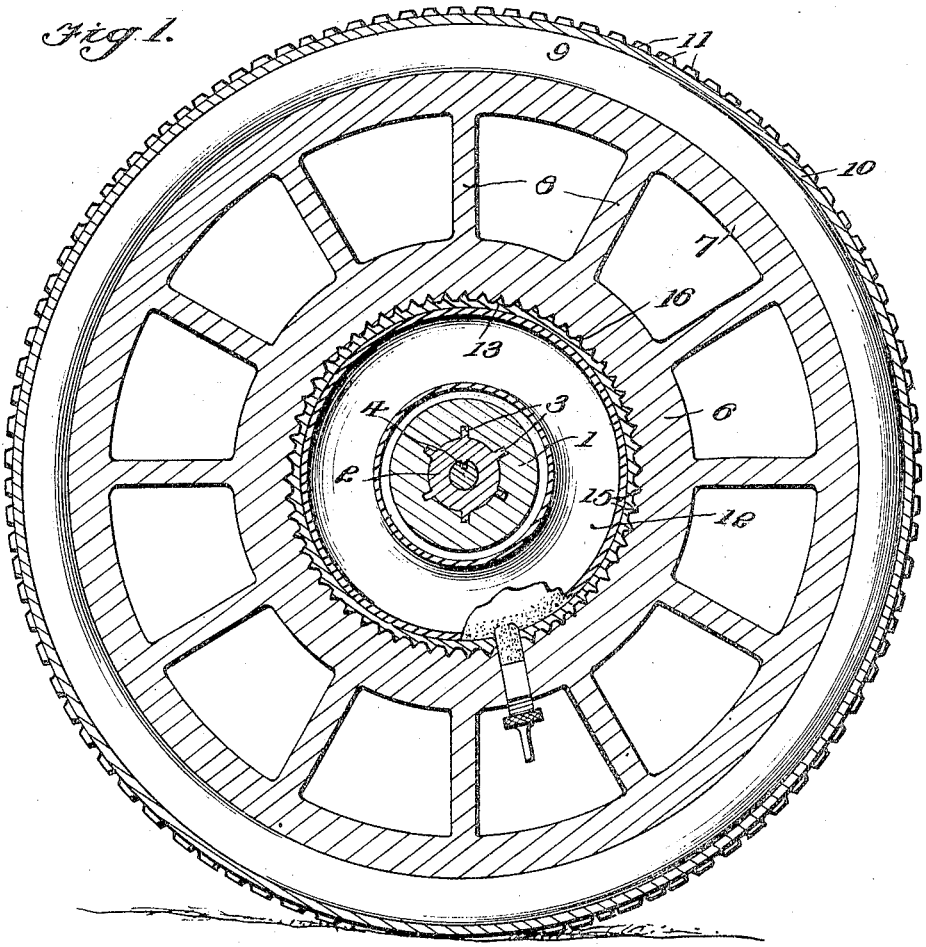
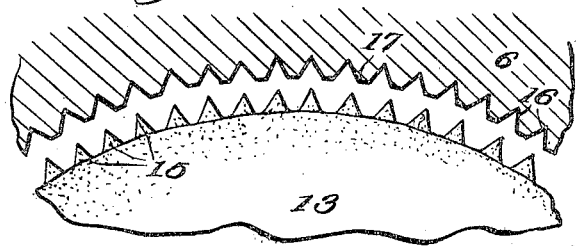

UNITED STATES PATENT OFFICE.

LEWIS S. ROBBINS AND JOHN R. DAVIS, OF VINE GROVE, KENTUCKY.

RESILIENT WHEEL.

1,047,297.  Specification of Letters Patent.  Patented Dec. 17, 1912.

Application filed April 15, 1911. Serial No. 621,343.

*To all whom it may concern:*

Be it known that we, LEWIS S. ROBBINS and JOHN R. DAVIS, citizens of the United States, residing at Vine Grove, in the county of Hardin and State of Kentucky, have invented certain new and useful Improvements in Resilient Wheels, of which the following is a specification.

The present invention relates to wheels for use on automobiles and like vehicles. In wheels of this character it is necessary to provide some means for absorbing the vibration and jar incident to travel, so as to prevent any undue jolting of the occupants of the vehicle and to insure against injury to or derangement of the parts of the machinery. This is usually accomplished by mounting a pneumatic tire on the rim of the wheel. However, such an arrangement has been found quite objectionable in practice since the tire is subjected to excessive wear and puncture through contact with the surface of the road and is also apt to become displaced from the rim when rounding a curve at a high speed.

The primary object of the present invention is to overcome the objections above noted, by providing a wheel consisting of an improved construction and arrangement of independent hub and rim portions with a pneumatic cushion interposed therebetween to impart the desired resiliency to the structure, the cushion being thoroughly housed between the parts so as to be protected from puncture or like injury.

Another object of the invention is to provide a pair of coacting side plates which are detachably mounted on the projecting ends of the boxing of the hub and which are formed with marginal flanges bearing against opposite sides of the rim portion of the wheel to maintain the hub and rim portions in alinement, the plates extending across the sides of the pneumatic cushion and being arranged in spaced relation thereto to afford ample clearance for the cushion when it spreads laterally under pressure.

A still further object of the invention is to provide a vehicle wheel which is reliable and efficient in operation, which is free from lost motion, which is particularly simple, durable and strong in construction, and which is comparatively inexpensive to manufacture.

For a full understanding of the invention, reference is to be had to the following description and accompanying drawing, in which:

Figure 1 is a longitudinal section of our improved wheel, the section being taken on the line 1—1 of Fig. 2; Fig. 2 is a transverse section on the line 2—2 of Fig. 3; Fig. 3 is a side elevation of the wheel, on a reduced scale; Fig. 4 is a detail perspective view of the metallic boxing; and, Fig. 5 is an enlarged detail view illustrating the interlocking connection between the pneumatic cushion and the inner rim.

Corresponding and like parts are referred to in the following description and indicated in all the views of the accompanying drawing by the same reference characters.

Referring to the drawing, the numeral 1 designates the hub of my improved wheel, which is preferably in the form of a solid wooden disk of any suitable diameter and thickness, the disk having substantially parallel side faces and being formed with a central bore for the reception of a hollow metallic boxing 2. Radiating from the periphery of the boxing are a plurality of integral ribs 3 which are embedded in the wooden hub in order to hold the boxing securely in position, and to cause the parts to turn together, a longitudinal key 4 being formed on the interior of the boxing and being adapted to be received in a groove in the axle spindle to provide a driving connection between the axle and the wheel. The ends of the boxing project beyond the side faces of the hub and are exteriorly screw-threaded, as indicated at 5, for a purpose to be hereinafter described.

The rim or circumferential portion of the wheel consists of concentric inner and outer rims 6 and 7 that are rigidly connected together through the medium of a series of spokes 8. Secured around the outer rim 7, is a solid tire of rubber or other suitable material or substance, the tire being preferably protected from wear by being inclosed in a leather casing 10. Metallic anti-slipping devices 11 are secured on the leather casing to prevent slipping and skidding.

The rim portion is yieldably held in concentric relation to the hub portion of the wheel by means of an interposed pneumatic cushion of conventional form, the cushion consisting of an inner pneumatic tube 12 and a casing 13. The cushion is seated on the periphery of the hub, and is rigidly secured thereto in any approved manner, preferably, by the usual clencher flanges 14. The inner rim 6 is considerably narrower than the hub and the pneumatic cushion and bears against the periphery of the cushion along the median line thereof, the inner surface of the inner rim being curved transversely to conform to the contour of the cushion, and to fit snugly thereon. It is necessary to provide an interlocking connection between the cushion and the inner rim in order to prevent the hub and cushion from turning within the inner rim when the axle is rotated. This connection is established through the medium of a series of pyramidal or other suitable projections 15 which are formed integral with and outstand from the periphery of the casing 13, and are received in correspondingly formed recesses 16 in the inner surface of the rim 6. As a further means for preventing any such independent rotary movement of the parts, a coating of rubber 17 is applied to the inner surface of the inner rim so as to effect a firm frictional engagement between the rim and the cushion.

18 designates a pair of co-acting metallic side plates which are arranged on opposite sides of the wheel and are centrally apertured to fit around the projecting ends of the boxing, the nuts 19 being turned into engagement with the threads 5 to detachably secure the plates in position. If desired, washers 20 may be interposed between the plates and the side faces of the hub to maintain the former in slightly spaced relation to the latter. The plates are of circular form and are curved inwardly toward each other, as indicated at 21, in proximity to their outer edges, for the purpose of providing offset marginal flanges 22 which bear evenly against opposite sides of the inner rim 6, the flanges guiding the rim portion of the wheel in its movement and holding the rim and hub portions in alinement. Annular wear plates 23 are secured at the side faces of the inner rim to prevent the rim from being worn away through frictional contact with the flanges. The curved portions 21 of the side plates are located on the outer side of and somewhat beyond the pneumatic cushion. It is to be noted that the distance between the plates is such that a space is provided on each side of the cushion to afford ample clearance for the cushion when the same spreads laterally under pressure. By virt' of this arrangement the side plates effectually inclose the pneumatic cushion, without in anywise interfering with the free operation thereof.

From the foregoing description in connection with the accompanying drawing, the operation of my improved wheel will be obvious. The pneumatic cushion will permit the hub and rim portions of the wheel to have an independent radial movement as the wheel passes over obstructions or inequalities in the road, the cushion thus absorbing the shocks incident to travel in a thoroughly effective manner. As the cushion is located within the rim of the wheel, it is protected from wear and the liability of puncture is obviated. The side plates coact with the hub and inner rim to entirely inclose the pneumatic cushion to shield it from the action of the elements.

In the present instance the parts are so arranged that the periphery of the rim 6 is normally flush with the outer edges of the flanges 22, this being preferred since it gives the wheel a neater appearance. However, it is to be understood that the invention is not limited to this particular proportion of the parts, but that the rim 6 may be of any suitable diameter according as found desirable. It is also to be understood that ball or other anti-friction bearings 23a may be set in the wear plates 23 or the rim 6 in order to cause the wheel to operate more freely and to reduce the wear through contact with the flanges 22.

What we claim is:

In a wheel, a hub including an outer portion and an inner portion, said inner portion engaging within the outer portion and reduced at the ends whereby bearing shoulders are produced at the juncture of the inner and outer hub portions, a rim, an annular pneumatic member bearing upon the outer hub portion, connecting means between the pneumatic member and the rim, coacting side plates connected to the reduced terminals of said inner hub and bearing against said shoulders, said side plates bearing at their outer portions against the connecting means.

In testimony whereof, we affix our signatures in presence of two witnesses.

LEWIS S. ROBBINS. [L. S.]
  JOHN R. DAVIS. [L. S.]

Witnesses:
  G. E. MAUMTRY,
  G. T. PINNER.